United States Patent
Edelmann et al.

[11] Patent Number: 6,109,788
[45] Date of Patent: Aug. 29, 2000

[54] LINEAR MOVEMENT BALL BEARING PROVIDED WITH BALL TRACK PLATES AND METHOD FOR DESIGNING BALL TRACK PLATES FOR SUCH BALL BEARING

[75] Inventors: Ludwig Edelmann, Sulzthal; Hermann Glöckner, Schweinfurt, both of Germany; Zoltán Lászlófalvi, Budapest, Hungary; Uwe Mayer, Münnerstadt, Germany; Henryk Velde, Werneck, Germany; Lothar Walter, Schweinfurt, Germany

[73] Assignee: SKF Linearsystems GmbH, Schweinfurt, Germany

[21] Appl. No.: 09/019,778

[22] Filed: Feb. 6, 1998

[30] Foreign Application Priority Data

Feb. 7, 1997 [DE] Germany ............ 197 04 633

[51] Int. Cl.$^7$ .................................................. F16C 29/06
[52] U.S. Cl. .................................................... 384/43
[58] Field of Search ................... 384/43, 49, 57

[56] References Cited

U.S. PATENT DOCUMENTS

| | | | |
|---|---|---|---|
| 4,334,716 | 6/1982 | Magee et al. | 384/43 |
| 4,512,617 | 4/1985 | Saravis, et al. | 384/43 |
| 4,789,249 | 12/1988 | Mutolo | 384/43 |
| 4,952,075 | 8/1990 | Rogers, III | 384/43 |
| 5,145,260 | 9/1992 | Edelmann et al. | 384/43 |
| 5,230,567 | 7/1993 | Takeuchi | 384/43 |
| 5,558,442 | 9/1996 | Ng | 384/43 |
| 5,666,861 | 9/1997 | Fee et al. | 384/57 X |

FOREIGN PATENT DOCUMENTS

| | | |
|---|---|---|
| 2 190 207 | 1/1974 | France . |
| 2 406 119 | 5/1979 | France . |
| 35 06 803 | 8/1986 | Germany . |
| 40 15 124 | 11/1991 | Germany . |
| 674 554 | 6/1990 | Switzerland . |
| 2 013 284 | 8/1979 | United Kingdom . |

*Primary Examiner*—David A. Bucci
*Assistant Examiner*—Colby Hansen
*Attorney, Agent, or Firm*—Burns, Doane, Swecker & Mathis, L.L.P.

[57] ABSTRACT

A ball bearing for permitting linear movements includes a cage having an inside surface that is adapted to surround a shaft. The cage also has ball tracks each defined by an axial guide track, an axial return track and two turn-around tracks which connect the ends of the guide track and the return track. The guide and return tracks have a radially inwardly open slit that extends along the lengths of the tracks. The guide tracks are covered by respective ball track plates provided with projections that project into grooves in the cage. To reduce tool and manufacturing costs, ball track plates having the same profile (i.e., identical outside diameters, ball track diameters, plate widths and plate thicknesses) are used for several ball bearing sizes with different bore and outside diameters.

3 Claims, 3 Drawing Sheets

LINEAR MOVEMENT BALL BEARING PROVIDED WITH BALL TRACK PLATES AND METHOD FOR DESIGNING BALL TRACK PLATES FOR SUCH BALL BEARING

This application claims priority under 35 U.S.C. §119 of German application No. P 197 04 633.9 filed on Feb. 7, 1997, the entire content of which is incorporated herein by reference.

FIELD OF THE INVENTION

The present invention generally relates to a ball bearing. More particularly, the present invention pertains to a ball bearing designed for linear movements and a method for effecting the constructive design of such a ball bearing.

BACKGROUND OF THE INVENTION

German Offenlegungsschrift No. 40 15 124 discloses a linear movement ball bearing that is designed to permit linear movements. The ball bearing includes a cage provided with a plurality of ball tracks. The ball tracks each receive and guide a plurality of balls. The outer surface of the cage houses a plurality of ball track plates that are circumferentially disposed about the circumference of the cage. In this ball bearing, each ball track plate is designed individually according to the outside diameter and width of the ball bearing, according to the ball size that is determined to be useful, and according to the number of ball rows to be accommodated along the circumference. The outside diameter and the ball size substantially determine the cross-sectional profile of the ball track plate which must transmit the occurring forces from the shaft to the load-bearing balls via the ball track plate to the housing, while at the same time ensuring a perfect rolling of the balls.

This means that for each size of the ball bearing for effecting linear movements, a separate ball track plate profile is designed, manufactured and integrated. This results in high tool costs for each ball track plate profile, with only a relatively small volume of each ball track plate profile being used.

In light of the forgoing, a need exists for a ball bearing of the type designed to permit linear movement, with such ball bearing being capable of being fabricated with relatively low manufacturing and tool costs.

SUMMARY OF THE INVENTION

The present invention involves using ball track plates with the same profile for several bearing sizes so that the ball track plates can be produced more economically, i.e., in fewer sizes and with greater volume for each size. This not only substantially reduces the tool costs, but also the manufacturing and stock-keeping costs to thereby result in a more cost-efficient production.

The profile of the ball track plate for the largest bearing size in a series can be used for the remaining bearing sizes of the series. As result, the larger outside diameter of the ball track plate in relation to the bore diameter of the housing brings about a support of the ball track plates in the housing at their edges, with no support in the center, i.e., the ball track plate rests concavely in the housing bore. On the one hand, this results in a stable position of the ball track plate under a load, while on the other hand resulting in a certain spring effect of the ball track plate, and thus a better osculation and load transmission between ball and ball track. It is, however, also possible to form the profile of the ball track plate based on the smallest bearing size in the series or based on an intermediate bearing size in the series.

The profile of the ball track plate can be determined by selecting a starting ball bearing size, and then determining the ball track diameter, the outside diameter, the thickness and the width of the ball track plate based on various characteristics associated with the starting bearing size such as the outside and inside diameters of the starting bearing size and the ball diameter of the balls that are to be used in the ball bearing.

The outside diameter of the ball track plate is adapted to correspond to the outside diameter of the starting size of the ball bearing or the diameter of the bore of the housing into which the ball bearing for linear movements is intended to be installed. The ball track diameter of the ball track plate, i.e., the curvature radius of the axially extending ball track groove, is slightly greater than the diameter of the ball selected for this bearing size, so that the osculation that commonly occurs between the balls and the ball tracks in ball bearings is attained. The width of the ball track plate corresponds approximately to 1.25 times the diameter of the ball selected for the largest bearing size. The plate thickness at the lowest point of the ball track is a result of half of the difference of the outside and inside diameter of the ball bearing minus the diameter of the ball.

In accordance with the present invention, a pair of ball bearings for permitting linear movement include differently sized first and second ball bearings. The first ball bearing is comprised of a first cage positionable inside a bore of a housing and having a plurality of ball tracks in each of which is positioned a plurality of balls. Each ball track is defined by an axial guide track, an axial return track and turn-around tracks connecting ends of the guide track with ends of the return track. The first cage has an outer circumference along which is distributed a plurality of recesses and ball track plates each inserted into one of the recesses. The second ball bearing is comprised of a second cage positionable inside a bore of a housing and having a plurality of ball tracks in each of which is positioned a plurality of balls. Each ball track of the second cage includes an axial guide track, an axial return track and turn-around tracks connecting ends of the guide track with ends of the return track. The second cage has an outer circumference along which is distributed a plurality of recesses with a ball track plate positioned in each of the recesses. The ball track plates of the first ball bearing have an outside diameter and a ball track diameter that are the same as the outside diameter and ball track diameter of the ball track plates of the second ball bearing.

According to another aspect of the invention, a method for producing ball bearings that permit linear movement involves selecting a first cage having an outside diameter, a plurality of axial guide tracks each connected to an axial return track by turn-around tracks and a plurality of radially outwardly opening circumferentially disposed recesses for receiving ball track plates, and placing a ball track plate in each recess of the first cage, with the ball track plates having a ball track with a curved cross-section for receiving balls. The method further involves selecting a second cage having an outside diameter, a plurality of axial guide tracks each connected to an axial return track by turn-around tracks and a plurality of radially outwardly opening circumferentially disposed recesses for receiving ball track plates, and placing a ball track plate in each recess of the second cage, with the ball track plates having a ball track with a curved cross-section for receiving balls. The ball track plates for the first cage have the same outside diameter and ball track diameter as the ball track plates for the second cage.

Another aspect of the present invention involves a method of producing ball bearings that permit linear movement and that include a cage having a plurality of ball tracks each defined by an axial guide track connected to an axial return track by turn-around tracks, a plurality of balls positioned in each ball track, and a plurality of circumferentially disposed recesses in which are positioned ball track plates. The method includes determining the profile of a ball track plate to be used in a plurality of ball bearings having different sizes. The determination of the ball track plate profile includes selecting a starting ball bearing size having an outside diameter and an inside diameter, determining the ball track diameter of the ball track plate for the starting ball bearing size based on the diameter of the balls to be positioned in the ball tracks of the starting ball bearing size, determining the outside diameter of the ball track plate based on the outside diameter of the starting ball bearing size, determining the width of the ball track plate in the circumferential direction, and determining the thickness of the ball track plate based on the inside and outside diameters of the starting ball bearing size and the diameter of the balls to be placed in the ball tracks. A plurality of ball bearings having different sizes are then produced using ball track plates having the same profile.

BRIEF DESCRIPTION OF THE DRAWING FIGURES

The foregoing and additional features and characteristics associated with the present invention will become more apparent from the following detailed description considered with reference to the accompanying drawing figures in which like elements are designated by like reference numerals and wherein.

DETAILED DESCRIPTION OF THE INVENTION

Figure 1:
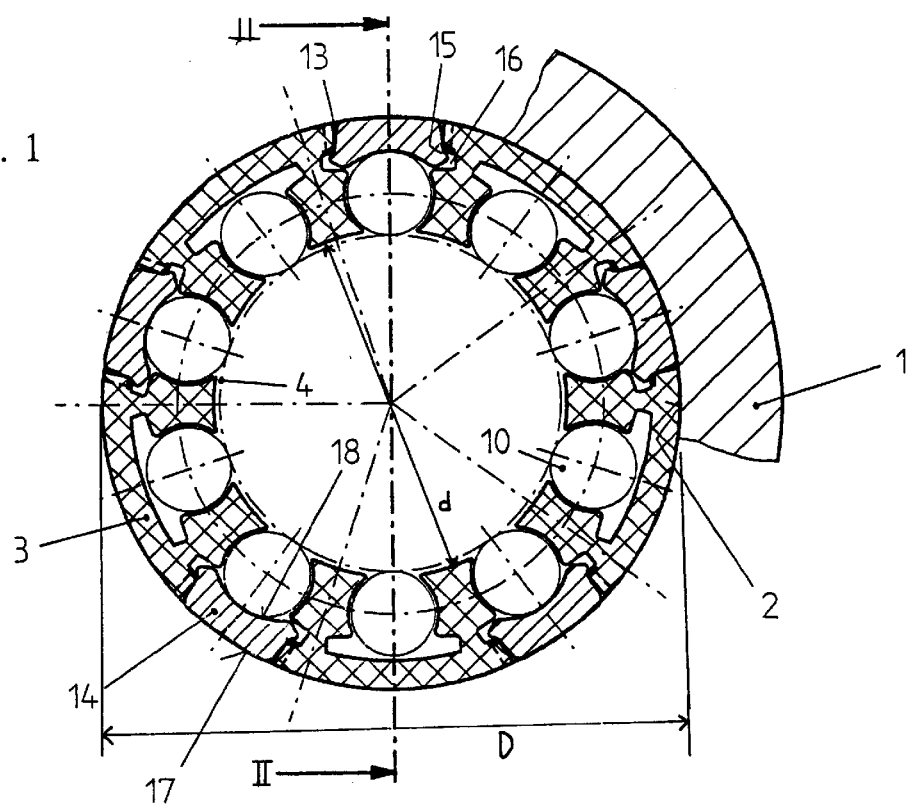
FIG. 1 is a cross-sectional end view of a ball bearing for permitting linear movement, with such ball bearing being installed in the bore of a housing.
Figure 2:
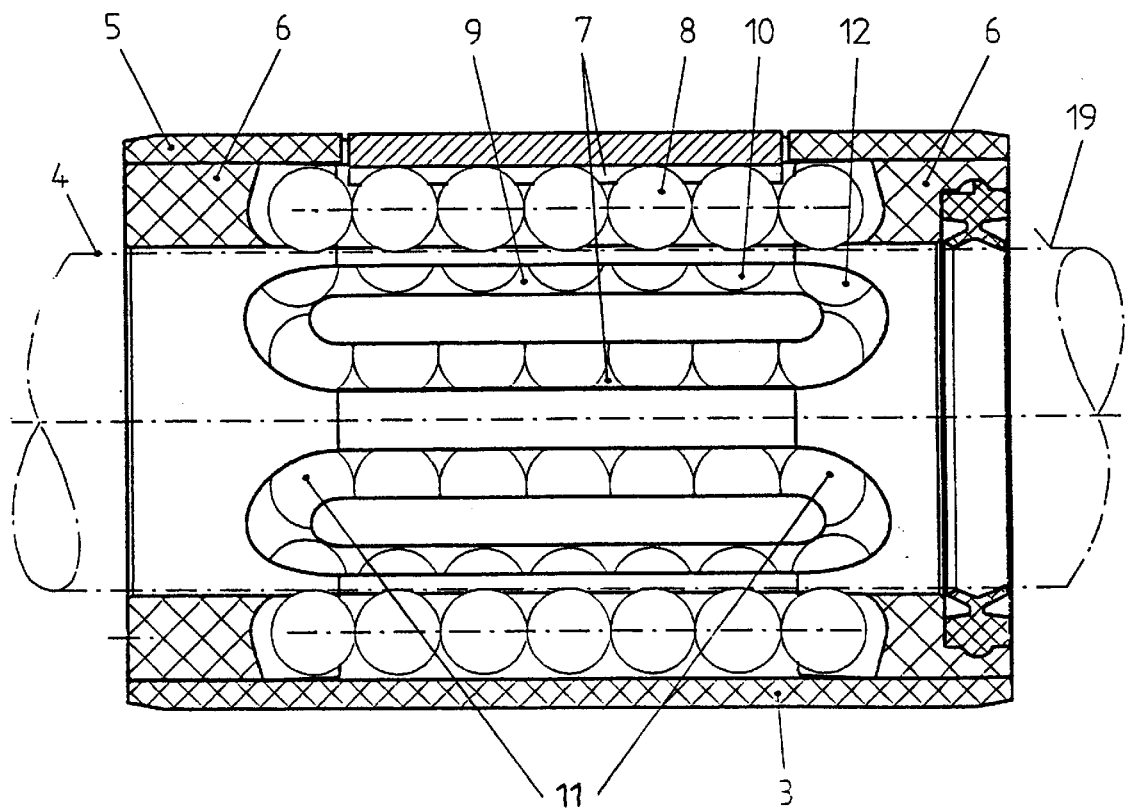
FIG. 2 is a longitudinal cross-sectional view along the section line II—II in FIG. 1, but without the housing.

With reference initially to FIG. 1, the ball bearing of the present invention for permitting linear movement includes a cage 3. The ball bearing is adapted to be positioned within a cylindrical bore 2 formed in a housing 1. The cylindrical bore 2 in the housing 1 possesses a diameter "D". The cage 3 of the ball bearing is adapted to receive a cylindrical shaft 4. The cage 3 is constructed in an annular cylindrical shape so that the inside surface of the cage 3 completely surrounds the cylindrical shaft 4. The shaft 4 possesses an outer diameter "d".

The cage 3 includes an end section 5 at each of its two ends. An annular cover 6 is set into each of these end sections 5. The cage 3 and the cover 6 are preferably made of a moldable or injectable plastic material.

The cage 3 is also provided with a plurality of axially extending continuous ball tracks distributed in a circumferential direction about the cage 3. The ball tracks each include an axially extending guide track 7 in which are positioned load-bearing balls 8, an axially extending return track 9 in which are positioned non-load-bearing balls 10, and a pair of turn-around tracks 11. The turn-around tracks 11 are circumferentially distributed about the radially inwardly facing inner surfaces of the two covers 6 and have a generally semicircular shape. Each turn-around track 11 connects the end of one guide track 7 with the end of an adjoining return track 9, thereby forming a plurality of closed tracks or continuous ball tracks in which the plurality of balls 8, 10 circulate. Thus, one guide track 7, one return track 9 and two axially opposing turn-around tracks 11 together form each ball track that is closed in itself and in which are located a plurality of the balls 8, 10.

Each closed ball track has a slit 12 that opens radially inwardly towards the shaft 4. Each slit 12 is designed so that portions of the balls 8, 10 are able to project through the slit 12, but the balls 8, 10 cannot fall out of the ball tracks through the slits 12. In this regard, the inner slit width of each slit 12 is preferably less than the ball diameter and is also less than the distance between the lateral walls defining the ball tracks 7, 9.

The cage 3 is provided along its outside region in the area of each of the guide tracks 7 with radially oriented breakthroughs or openings 13 that are covered by ball track plates 14 of steel. To hold these ball track plates 14 in the cage 3, the ball track plates 14 are provided with projections 15 that project into grooves 16 formed in the cage 3.

Figure 3:
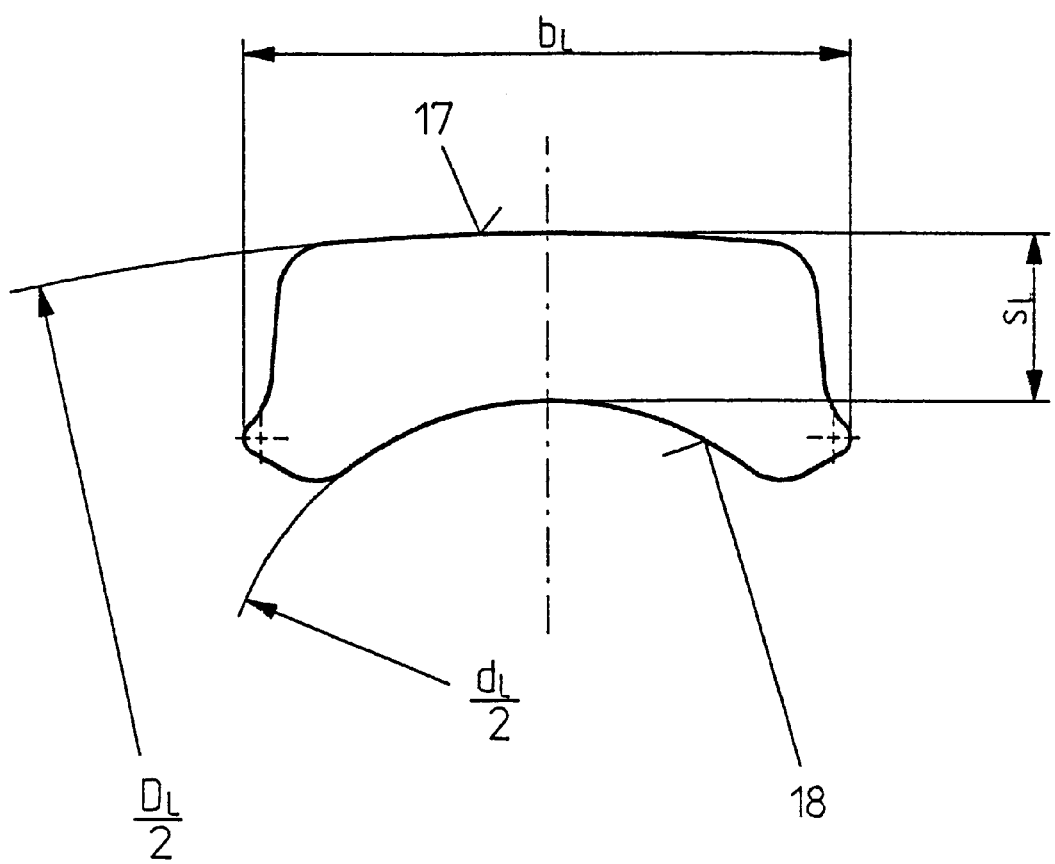
FIG. 3 is an end view of a ball track plate used in the ball bearing of the present invention.

As seen with reference to FIG. 3, each ball track plate 14 has a jacket surface 17 that is curved with a curvature radius of "$D_L$"/2, wherein $D_L$ corresponds to the outside diameter D of the ball bearing. Each ball track plate 14 also includes on its inside surface an axially extending, groove-shaped ball track 18 that is curved with a ball track radius of $d_L/2$. This ball track radius $d_L/2$ is slightly greater than half of the diameter ($D_W$) of the load bearing balls 8. The width or circumferential extent of the ball track plate 14 is designated by "$b_L$", and the thickness of the ball track plate in the radial direction is designated by "$S_L$".

When the shaft 4 is moved back and forth axially, the balls 8 roll between the ball track 18 of the respective ball track plate 14 and the cylindrical outer surface of the shaft 4. The balls 8 thus transfer a radial load from the shaft 4 via the ball track plate 14 to the bore of the housing 1 into which the ball bearing is set. The load-bearing balls 8 move from the load-bearing zone (i.e. from the guide tracks 7) via the turn-around tracks 11 and into the return tracks 9 (i.e. into the non-load-bearing zone), and from there move as non-load-bearing balls 10 via the turn-around tracks 11 back into the guide track 7.

In accordance with the present invention, ball track plates 14 with the same profile (i.e., with identical outside diameter, ball track diameter, plate width, and plate thickness) are employed for several different bearing sizes. That is, ball track plates 14 having the same outside diameter, ball track diameter, plate width, and plate thickness are used with ball bearings having different outside diameters and/or different inside diameters.

Figure 4:
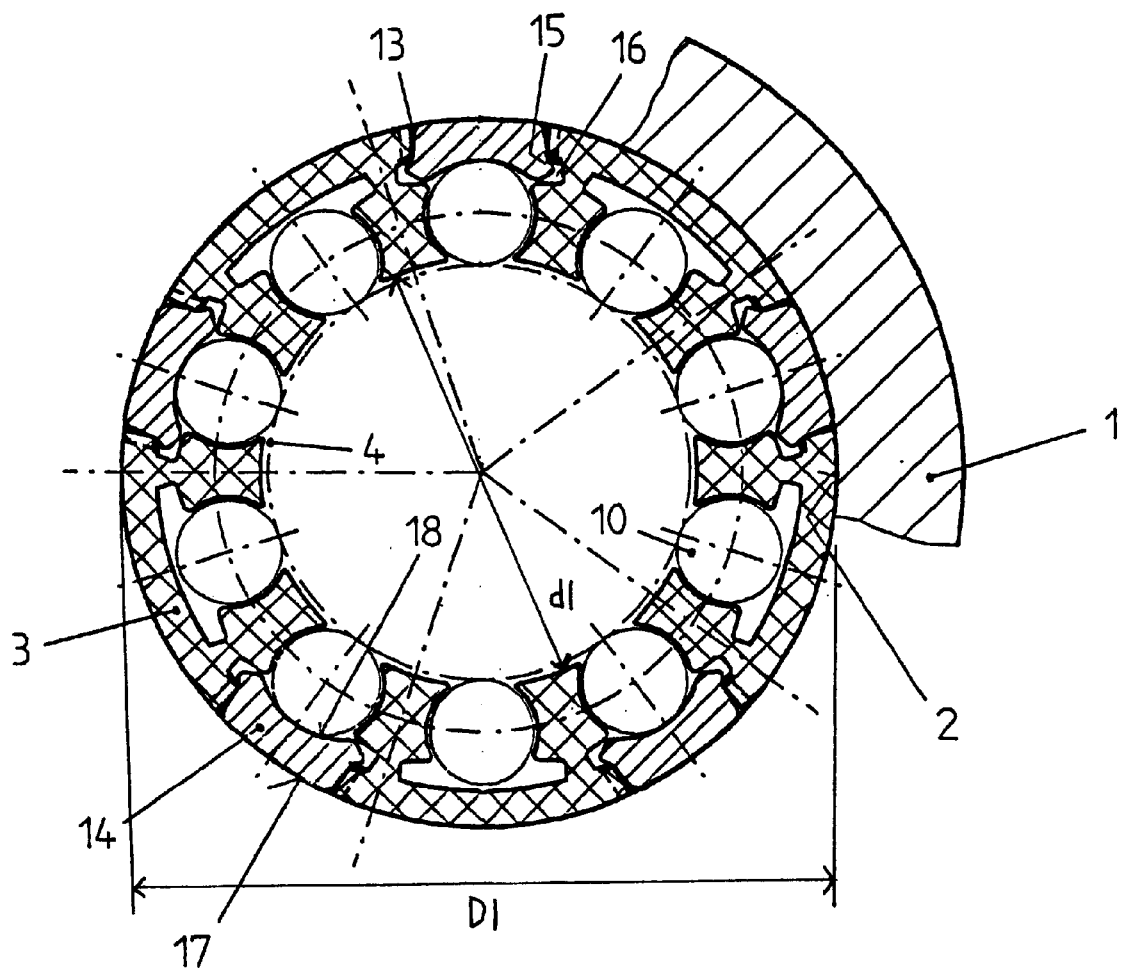
FIG. 4 is a cross-sectional end view of a ball bearing similar to FIG. 1, except that the ball bearing possesses a smaller outer diameter and/or smaller inner diameter.

By way of illustration, FIG. 1 illustrates a ball bearing having an outside diameter D and an inside diameter d while FIG. 4 illustrates a ball bearing having an outside diameter D1 and an inside diameter d2, wherein D1<D and d1<d. In accordance with the present invention, ball track plates 14 having the same profile can be employed in the ball bearing illustrated in FIG. 1 as well as in the ball bearing illustrated in FIG. 4. In this way, the ball track plates 14 can be produced more economically, i.e., in fewer sizes and with greater volume for each size. This not only substantially reduces the tool costs, but also results in a reduction of the manufacturing and stock-keeping costs to achieve a more cost-efficient production.

According to the present invention, for a given series of bearing sizes, the profile of the ball track plate 14 required for the largest bearing size in the series is used for the remaining bearing sizes in the series. Consequently, the larger outside diameter of the ball track plate 14 in relation to the bore diameter of the housing 1 brings about a support of the ball track plates 14 in the housing at their edges, with no support in the center so that the ball track plate rests concavely in the housing bore. This results in a stable position of the ball track plate under a load while also producing a certain spring effect of the ball track plate, and thus a better osculation and load transmission between the ball and ball track.

It is, however, also possible for a given series of ball bearing sizes to form the ball track plate with a profile designed for the smallest bearing size of the series and to then use that ball track plate profile for the remaining bearing sizes in the series. In this case, to achieve a stable positioning of the ball track plate in the cage, additional measures may be necessary to allow ball bearings of different sizes within the series to retain the ball track plates in position within the cages for the differently sized ball bearings in the series. For example, when the profile of the ball track is determined on the basis of the smallest ball bearing in a series, the outer diameter or radius of curvature of the outer surface of the ball track will be smaller than the diameter of the housing. This means the ball track may only be supported by the housing in the middle portion of the ball track. This could result in canting or tilting of the ball track. To address this, the projections 15 and the grooves 16 can be designed to substantially exactly match one another. In the alternative, sheets or ribbons of metal or plastic can be glued or otherwise fixed to the edges of the outer surface of the ball tracks. As a further possibility for designing the ball track profile, it is possible to design the profile of the ball track plate for a medium bearing size in a bearing size series and to then use such ball track plate profile as the profile for the remaining bearing sizes in the series.

The profile for several bearing sizes can be prefabricated in long lengths, and can be cut off at the required length of the ball track plates as needed. This would thus permit the use of ball track plates having not only the same profile but also the same length.

It is also possible within the context of the present invention to use balls with the same diameters for different ball bearings sizes within a series. This also contributes to a reduction in manufacturing costs.

The present invention also involves a method for determining the profile of the ball track plates of a linear movement ball bearing (i.e., a ball bearing designed to permit linear movements). The method involves first selecting a starting ball bearing size having a main outside dimension determined in accordance with valid standards. The starting ball bearing size can be the largest ball bearing size in a series. Alternatively, as mentioned above, the starting bearing size can be the smallest bearing size or an intermediate bearing size within the series. The ball track diameter of the ball track plate for the starting bearing size is then determined based on the diameter of the ball that is optimal for this starting bearing size. The outside diameter of the ball track plate is then determined according to the outside diameter of the starting bearing size. The greatest width (in the circumferential direction) of the ball track plate is then determined followed by calculation of the thickness of the ball track plate based on the outside and inside diameter of the starting bearing size and the diameter of the ball used in the starting bearing size. Once the profile of the ball track plate is determined, a ball track plate having such a profile, (i.e., having the determined outside diameter, ball track diameter, plate width, and plate thickness) can then be manufactured and placed in the radial breakthroughs of the cages forming the differently sized ball bearings within the series.

The outside diameter of the ball track plate corresponds to the outside diameter of the starting size of the ball bearing or the diameter of the bore of the housing into which the linear movement ball bearing is to be installed. The ball track diameter of the ball track plate (i.e., the curvature radius of the axially extending ball track groove) is slightly greater than the diameter of the ball selected for this bearing size so that the osculation that commonly occurs between the ball and the ball track in the ball bearings is attained. The width of the ball track plate corresponds approximately to 1.25 times the diameter of the ball selected for the largest bearing size. The plate thickness at the lowest point of the ball track is a result of half of the difference of the outside and inside diameter of the ball bearing minus the diameter of the ball.

After determining the dimensions of the profile of the ball track plate and then manufacturing a ball track plate having such a profile, the lengths of the ball track plates needed for the individual sizes are cut. In a known manner, the cut parts are hardened and surface-finished, for example by vibratory grinding, etc., and are then installed into cages corresponding to the desired bearing size. The cages can be injection molded from plastic, Finally, the balls are then placed in individual rows within the ball tracks to form the finished ball bearings.

The following are examples for the design of four ball bearing sizes of a series of ball bearings, starting with the largest bearing size (Type 20).

| Type | Outside diameter, bearing (mm) D | Shaft diameter, bearing (mm) d | Outside diameter, ball track plate (mm) $D_L$ | Ball track diameter, ball track plate (mm) $d_L$ | Width, ball track plate (mm) $b_L$ | Thickness, ball track plate (mm) $S_L$ | Ball diameter (mm) $D_w$ |
|---|---|---|---|---|---|---|---|
| 20 | 28 | 20 | 28 | 3.8 | 3.75 | 1.0 | 3 |
| 16 | 24 | 16 | 28 | 3.8 | 3.75 | 1.0 | 3 |
| 12 | 19 | 12 | 28 | 3.8 | 3.75 | 1.0 | 2.5 |
| 10 | 17 | 10 | 28 | 3.8 | 3.75 | 1.0 | 2.5 |

The present invention thus provides a way of producing ball track plates for linear movement ball bearings that is highly advantageous from an economical standpoint. By virtue of the present invention, the ball track plates can be produced in fewer sizes and with greater volume for each size. This substantially reduces the tool costs and results in a more cost-efficient production as it requires far fewer different profiles of ball track plates.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A pair of ball bearings for permitting linear movement, comprising:

a first ball bearing comprised of a first cage, the first cage having an inside surface, said first cage having a plurality of ball tracks in each of which is positioned a plurality of balls, each ball track including an axial guide track, an axial return track and turn-around tracks connecting ends of the guide track with ends of the return track, said first cage having at least in the axial guide tracks slits that are open radially inwardly and through which the balls are exposed, said first cage having an outer circumference along which is distributed a plurality of recesses and ball track plates each inserted into one of the recesses, said ball track plates having axially extending ball tracks with a curved cross-section possessing an inner radius of curvature for receiving the balls in the guide tracks, said ball track plates having an outer radius of curvature; and a second ball bearing comprised of a second cage, the second cage having an inside surface, said second cage having a plurality of ball tracks in each of which is positioned a plurality of balls, each ball track of the second cage including an axial guide track, an axial return track and turn-around tracks connecting ends of the guide track with ends of the return track, said second cage having at least in the axial guide tracks slits that are open radially inwardly and through which the balls are exposed, said second cage having an outer circumference along which is distributed a plurality of recesses with a ball track plate positioned in each of the recesses, said ball track plates in the second cage having axially extending ball tracks with a curved cross-section possessing an inner radius of curvature for receiving the balls in the guide tracks, said ball track plates in the second cage having an outer radius of curvature;

said first ball bearing and said second ball bearing having different outer diameters, the inner radius of curvature of said ball track plates of said first ball bearing being the same as the inner radius of curvature of the ball track plates of the second ball bearing, the outer radius of curvature of the ball track plates of said first ball bearing being the same as the outer radius of curvature of the ball track plates of said second ball bearing.

2. Ball bearings according to claim 1, wherein the ball track plates of the first and second ball bearings each possess a plate width and a plate thickness, the plate width and plate thickness of the ball track plates of the first ball bearing being the same as the plate width and plate thickness of the ball track plates of the second ball bearing.

3. Ball bearings according to claim 1, wherein the first ball bearing has an inner diameter that is different from the inner diameter of the second ball bearing.

* * * * *